April 2, 1963      J. T. MULLER      3,083,647

METERING DEVICE

Filed May 8, 1961

INVENTOR.
John T. Muller
BY
March and Curtiss
ATTORNEY

United States Patent Office 3,083,647
Patented Apr. 2, 1963

3,083,647
METERING DEVICE
John T. Muller, 50 W. Lawn Road, Livingston, N.J.
Filed May 8, 1961, Ser. No. 108,549
3 Claims. (Cl. 103—148)

This invention relates to metering devices, and more particularly to devices for metering fluids for proportional mixing with other materials as, for example, the metering of chlorine into the water circulating system of a swimming pool, or of ingredients into food processing mixtures, or in the production of chemical solutions or compounds, or for an infinite variety of other purposes.

In another respect, the present invention relates to devices employing a flexible and resilient tube or hose and utilizing the repeated progressive collapsing of the tube to effect a pumping as well as a metering action. Such devices of the prior art, however, have several disadvantages, outstanding among which are the complicated construction, cost of manufacture and maintenance. Usually such devices require a housing to contain the operating parts and utilize an eccentric rotor principle of operation. The tube is not readily accessible and the unit is not easy to assemble and disassemble. Moreover, the eccentric rotor mechanism is costly to manufacture, involves many parts, and requires experience to assemble and maintain; and in operation it requires substantially perfect balance to avoid excessive vibration and rapid wear not only of the rotor assembly itself, but of the tube and the unit as a whole. Furthermore, while adequate, perhaps, from a pump standpoint, usually such devices lack the degree of accuracy desirable in a sensitive metering device.

It is an object of the present invention to obviate the foregoing disadvantages and provide a novel metering device which is smooth and accurate in its operation, and also novel by virtue of its simplicity of construction alone.

Another object of the invention is to provide a metering device of the character referred to which is easily assembled and disassembled, inexpensive to maintain, and requires little or no experience to install, use and maintain.

A further object of the invention is to provide a metering device so constructed that it can be made inexpensively and in different sizes from large to relatively miniature, without departing from a common structural design, the quality of sturdiness, or the accuracy of operation.

A still further object of the invention is to provide a metering device which is made of lightweight materials, has a minimum of moving parts, and is subject to a minimum amount of wear.

Other objects and advantages will be apparent from the detailed description set forth hereinafter.

In carrying out the invention, and in its broader aspects, there is contemplated the use of a flexible and resilient tube disposed in a straight line on a flat support, and a helix cam arranged alongside the tube diametrically opposite the support and in contact with the tube, the throw of the cam being equal to the inside diameter of the tube, whereby rotation of the cam progressively collapses the tube throughout the extent of the effectiveness of the cam. The cam is formed to operate with cyclic rhythm, whereby as the collapsing of the tube progresses and pressure is relieved following such progression the tube resumes its uncollapsed condition, but before the first collapsing operation is completed a second one is commenced, thereby trapping a given quantity or volume of fluid in the tube between the two points of tube collapse. The operation is repeated with cyclic regularity for any desired period of time, depending upon the quantity of fluid to be metered through the tube as determined by the number of cycles and the volume of fluid trapped and moved on during each cycle.

A more specific description of the device of the present invention, and the method of operation contemplated by the invention, will be set forth in the detailed description to follow.

In the accompanying drawings, the invention has been shown merely by way of example and in preferred form and obviously many variations and modifications thereof may be made, without departing from its spirit, which will still be comprised within its scope. It is to be understood, therefore, that the invention is not limited to any specific form or embodiment, except insofar as such limitations are set forth in the appended claims.

Referring to the drawings.

Figure 3:
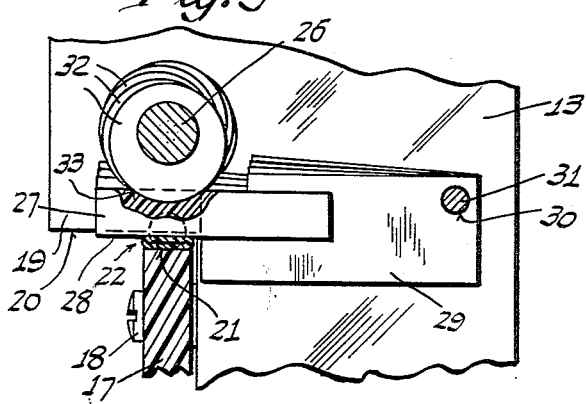
FIG. 3 is a sectional elevation taken on the line 3—3 of FIG. 2, looking in the direction of the arrows, and partly broken away to show the construction.

According to a preferred embodiment of the invention, as shown in the drawings the metering device 10 comprises a base 11, side walls 12 and 13 rising vertically therefrom in spaced-apart relation and a cover plate 14 secured to the top of the side walls 12 and 13 by pins 15 carried by the cover plate and seated in vertical drill holes 16 formed in the side walls. A front plate 17 is secured to the side walls 12 and 13 in a quick-detachable manner, as by screws 18. The upper portions of the side walls 12 and 13 are formed to extend forwardly beyond the front plate 17, as at 19 (see FIG. 3), the lower edges 20 of the extensions 19 being spaced from the top edge 21 of the plate 17 to provide a recess 22 for accommodating the length of tube 23. The tube 23 extends from a point outside the side wall 12 across the space between the side walls to a point outside the opposite wall 13, and is arranged to rest upon the upper edge 21 of the plate 17 for vertical support thereby. The plate 17 and the lower edges 20 of the side walls 12 and 13 cooperate to retain the tube in such position, and the top edge 21 of the plate 17 serves as a fixed platen beneath the tube 23.

In a plane above the top edge 21 of the front plate 17, the side wall extensions 19 are formed each with an aperture 24 to provide a seat into which a ball (or roller) bearing 25 is pressed fitted to support the ends of a cam shaft 26. Interposed between the upper surface of the tube 23 the cam shaft 26 is a series of pressure bars 27 arranged in contiguous side-by-side relation. Each pressure bar 27 is formed with a flat bottom surface 28 of substantial width and of sufficient length to over-lie the tube 23 throughout its transverse dimension when the tube is collapsed, and the pressure bar is carried by a rearwardly extending fin or tail piece 29 formed with a drill hole 30 to receive a supporting rod or pin 31, the latter having a close but movable fit within the drill hole 30 to permit the fin 29 to pivot freely thereon.

In the preferred embodiment shown in the drawings, the cam shaft 26 is formed with a plurality of disks 32 whose eccentrics 33 are arranged in offset relation circumferentially of the shaft 26 in the form of a helix extending axially of the shaft 26. The pitch of the helix is such that it makes one turn about the shaft 26 in a distance greater than half the distance between the side walls 12 and 13 but less than the full distance between the side walls, and the throw of the cam disks is equal to the inside diameter of the tube 23, all for a purpose which will be brought out in more detail in describing the operation of the metering device.

Preferably, the frame structure of the metering device of the present invention is made of a synthetic resin material which is transparent. A suitable material for this purpose would be that known as Lucite which is easily fashioned and from which a device of the desired capacity ranging from large to substantially miniature may be made. Its transparency provides for observation of the operation and functioning of the parts while the unit is in its fully assembled condition. Moreover, it provides for a light weight unit, since in operation the device is not subject to vibration and other undue stresses and strains. The tube 23 is preferably made of material such as vinyl plastic, which is very tough, flexible and resilient. The pressure bars 27, including the fins 29 are also preferably made of a synthetic resin material. The pins 15, screws 18, bearings 25, and cam shaft 26, with its cam disks 32, are preferably made of metal for strength and durability, although if desired they too could be made of other and lighter materials.

It is also pointed out that instead of separate disk cams 32 a continuous helix cam surface could be formed on the shaft 26. Moreover such continuous surface cam could be disposed in the frame structure so that the cam surface would directly contact the top surface of the tube 23.

Figure 1:
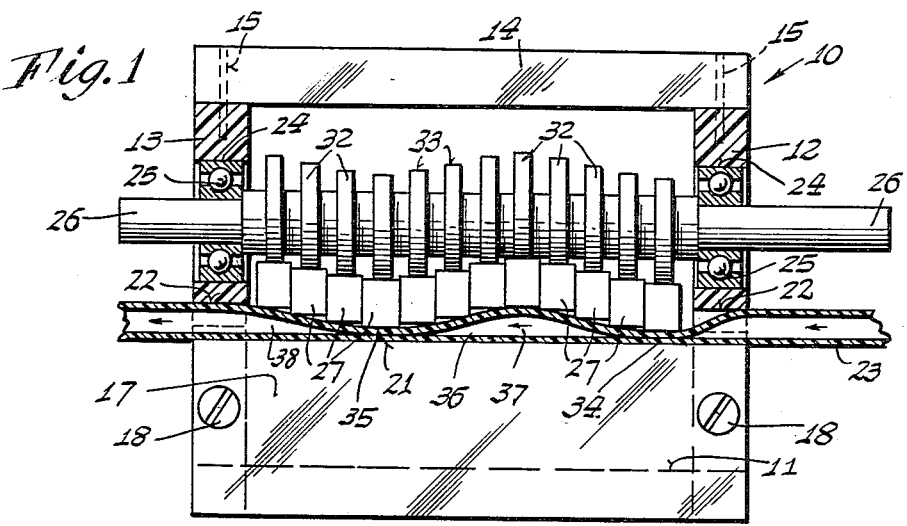
FIG. 1 is a front elevation, partly in section, of a metering device made according to the present invention.
Figure 2:
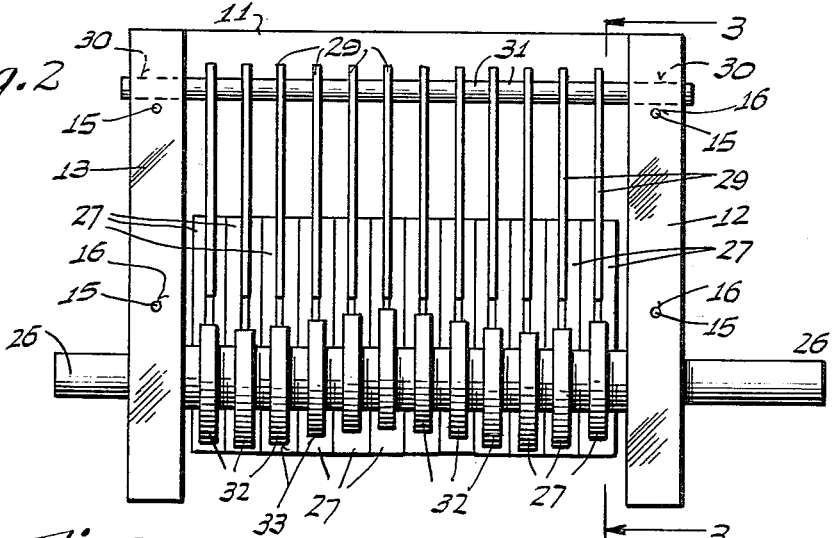
FIG. 2 is a top plan view of the device shown in FIG. 1.

In operation, the end of the tube 23 extending outwardly from the side wall 12 is connected to a source of fluid supply (not shown) from which the fluid flows to and through the tube in the direction of the arrows (FIG. 1) and is discharged through the opposite end of the tube 23, extending outwardly beyond the side wall 13, either freely or into a pipe connection therewith depending upon the use to which the metering device 10 is being put.

As already stated, the throw of the cam disks 32 is equal to the inside diameter of the tube 23 so that when the high point 33 of the disk is in engagement with its respective pressure bar 27, the portion of the tube 23 beneath that particular pressure bar is completely collapsed and shuts off the flow of fluid through the tube. Thus, since the pitch of the helix is less than the distance between the side walls 12 and 13, the tube 23 will be collapsed at two points, such as 34 and 35, to prevent the flow of fluid therethrough and a given quantity or volume of fluid will be trapped in the intermediate space 36 provided by the uncollapsed portion of the tube between the points 34 and 35. This is a definite, predetermined quantity or volume of fluid. When the cam shaft 26 is rotated, it operates, as stated, in cyclic rhythm commencing with the collapsing of the tube at the point 34 near the side wall 12, and the gradual relieving of pressure by the pressure bars 27 so that the resilient tube 23 can resume a completely uncollapsed condition, as at 37. Thereafter there is a gradual application of pressure on the tube 23 by the pressure bars 27 until a complete collapse is again effected at the point 35. This is followed by the relief of pressure whereby the tube 23 resumes an uncollapsed condition at the point 38.

Continued operation, progressively collapsing the tube 23 in the direction of the delivery flow of the fluid, carries the trapped fluid in the area 36 along through the tube for subsequent discharge therefrom. Meanwhile, as the pressure is relieved commencing at the point 34 until it is again applied at 35, the tube has been allowed to become uncollapsed at the point 34 so that more fluid flows thereinto and becomes trapped therein when the tube is again collapsed at the point 34. This operation, metering off a a given quantity or a volume of fluid and forcing it out of the other end of the tube 23 continues as long as fluid is supplied and the cam shaft 26 is rotated. Hence, during any given time interval, a definite, determinable and controlled quantity or volume of fluid can be passed through the tube 23 in metered quantities.

The cam shaft 26 is rotated by any suitable prime mover such as an electric motor (not shown) having a driving connection therewith. The operation of the prime mover, in turn, can be controlled by a timing mechanism which can be preset to start the operation, permit the operation to continue for a given period of time (or number of cycles) and then stop the operation. Except for the fact that obviously some means is required to rotate the cam shaft 26, the present invention is not concerned with the particular means employed.

It will be understood that the simplicity of construction in the device of the present invention provides for ready accessibility of the tube 23 by simply removing the screws 18, the front plate 17 may be detached and the tube 23 will thereupon be exposed or removed for cleaning purposes or for the substitution of a new tube. Heretofore, one of the prime difficulties encountered in metering devices was the inability to easily remove the tube which, under various conditions, may be clogged or otherwise blocked so that the passage of the liquid is prevented. With the construction of the present invention, such difficulty is overcome and by a simple operation, as aforesaid, the tube is exposed for removal either for cleaning of the same tube or for the ready insertion of a new tube functioning in the manner described.

As mentioned heretofore, the invention has been shown and described herein merely by way of example and in preferred form and it is to be understood that the invention is not limited to any specific form or embodiment except insofar as such limitations are set forth in the appended claims.

Having thus described my invention, what I claim is:

1. A fluid metering device comprising in combination, a frame formed with side walls and a plate removably connected to and supporting the side walls in spaced-apart relation, said plate being formed with a straight top edge, a flexible and resilient tube supported on the top edge of said plate, said plate and side walls being formed to cooperate for holding the tube in position on the plate, said tube extending through said side walls and being supported thereby, a pair of bearings mounted one in each side wall above the top edge of the plate, and a shaft journaled at its opposite ends in said bearings, said shaft being formed as a helix cam and arranged for exerting pressure on the tube, and the throw of the cam being equal to the inside diameter of the tube whereby to progressively collapse the tube as the shaft is rotated.

2. A combination as in claim 1, including quick detachable means connecting the plate to the side walls to provide for the easy removal and replacement of the tube.

3. A combination as in claim 1, including a series of pressure bars in contiguous side by side arrangement with their forward portions interposed beneath the cam to rest on top of the tube, a rod extending between and detachably supported on the side walls pivotally supporting the rear ends of the pressure bars.

References Cited in the file of this patent
UNITED STATES PATENTS

| | | |
|---|---|---|
| 1,922,196 | Butler | Aug. 15, 1933 |
| 2,412,397 | Harper | Dec. 10, 1946 |